Aug. 18, 1970  W. H. PETERSON  3,524,982
VEHICLE SPEED CONTROL DEVICE
Filed Dec. 29, 1967  2 Sheets-Sheet 1
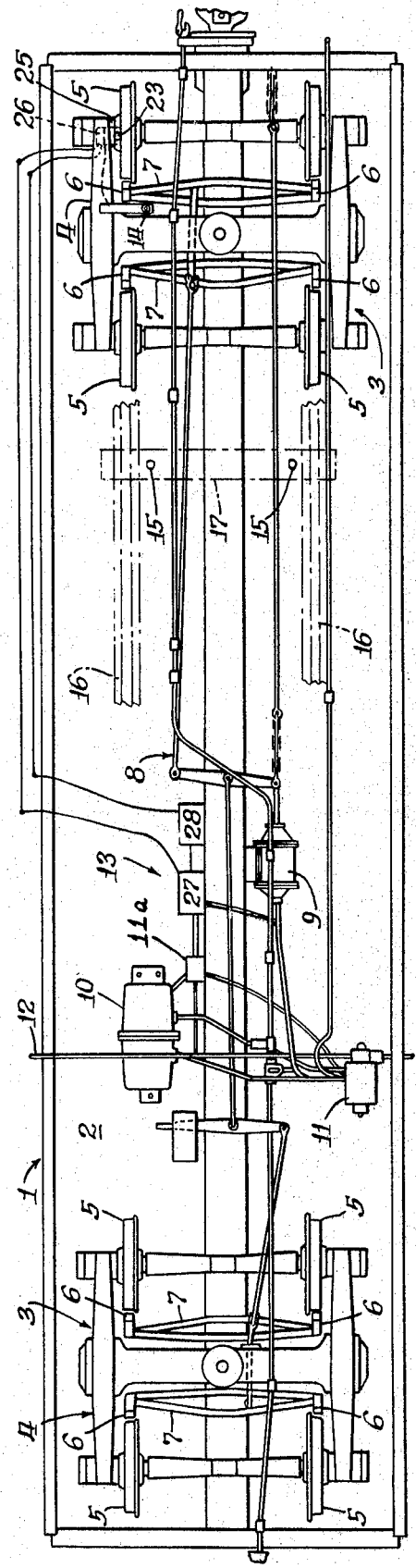
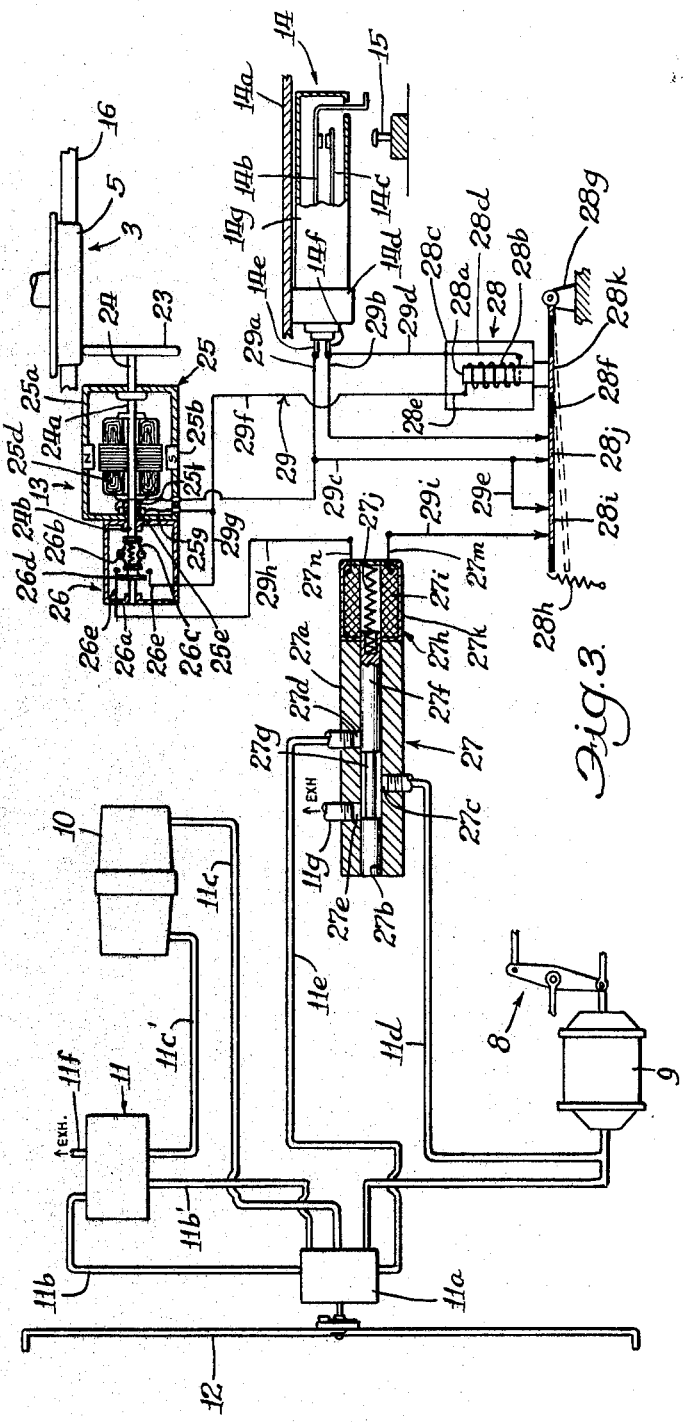
Inventor:
William H. Peterson
By: Richard J. Myers
Atty.

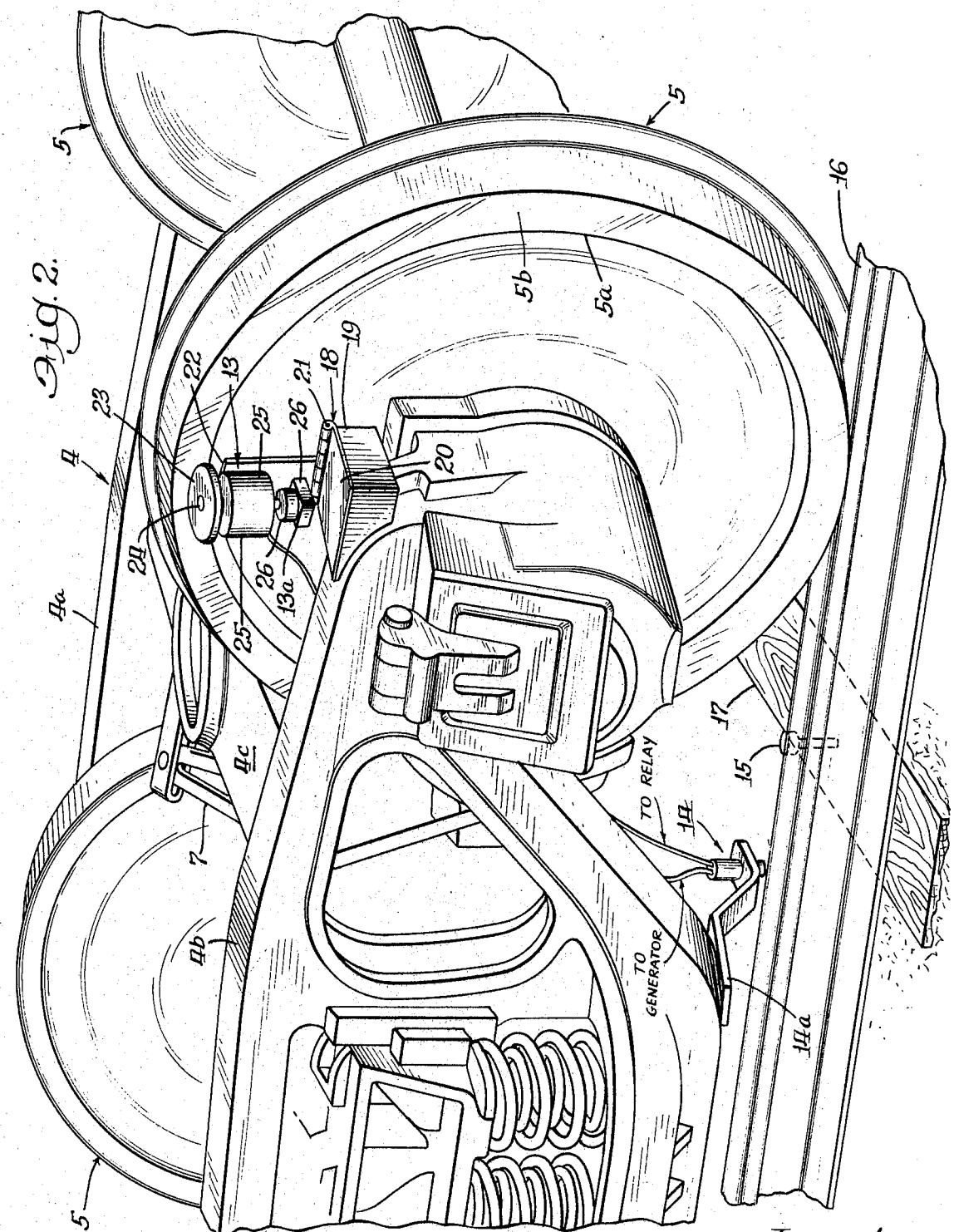

3,524,982
VEHICLE SPEED CONTROL DEVICE
William H. Peterson, Homewood, Ill., assignor to Pullman Incorporated, Chicago, Ill., a corporation of Delaware
Filed Dec. 29, 1967, Ser. No. 694,447
Int. Cl. B61l 3/12
U.S. Cl. 246—182                               33 Claims

ABSTRACT OF THE DISCLOSURE

Apparatus for controlling the coupling speed of a railroad car within the ladder track of a classification yard so as not to exceed a predetermined maximum speed, comprising an on-car speed control device including a generator and speed responsive switch driven by the car wheel means, a ground-mounted magnetic element mounted on the track ahead of and on the vehicle and a magnetic switch mounted on the vehicle and operated by the element as the vehicle passes over the element for closing an electrical circuit relay means whereby when the vehicle speed exceeds the predetermined speed the responsive switch completes and maintains an in-circuit solenoid operated pressurized air supply valve which is energized by the generator to supply braking pressure to the car braking system for applying brakes to the car wheel means whereby when the speed of the vehicle falls below the predetermined speed, the speed responsive switch opens the circuit for releasing the vehicle brakes.

CROSS-REFERENCES TO RELATED APPLICATIONS

This application is related to my copending applications having respective Ser. Nos. 694,435 and 694,705, filed on Dec. 29, 1967.

BACKGROUND OF THE INVENTION

Field of invention

The field of art to which this invention pertains is the railroad car coupling impact control devices where it is desirable to control the extent of impact between two railroad cars coming into contact with one another and, in particular, to control the extent of impact of a moving railroad car with a standing railroad car in a ladder track of a classification yard. It is desired to prevent damage to lading as a result of the coupling impact of the one railroad car upon another. This is accomplished by controlling the coupling speed of the moving vehicle relative to the standing vehicle by the use of a speed control device.

Description of the prior art

There are two basic approaches to the problem of damage to cars and lading resulting from coupling impacts between cars during switching operations. One is to cushion the cars and the other is to control the speed of impacts. According to an AAR (Association of American Railroads) survey based upon observations of some 5,000 impacts, 99% of them occur at 10 m.p.h. or less. If impacts could be held to no more than 3 to 4 m.p.h., the problem would be practically eliminated. Up to now, the only means used by railroads for controlling car speeds during switching is the car retarder. These retarders slow a car down by exerting a clamping force on the wheel rim over a certain length of track. A master retarder is located on the down slope of the hump and then as tracks fan out through the various curves and switches, group retarders are placed at the entry into groups of ladder or classification tracks. Each group retarder will control about 6 to 10 ladder tracks. The ladder tracks are all on a grade of about 1% downward except toward the end of the yard the grade is made slightly ascending. For most cars, this grade will cause a car to roll at a fairly constant speed, although some of the older yards use a little higher grade and the newer roller bearing cars tend to accelerate excessively in them. The final objective is to start the car down each ladder track at 4 m.p.h. and then allow the nonaccelerating grade in the yard to move the car down the track at this speed until it couples to cars already on the track. The grades at a flat switch yard are essentially the same as in a hump yard except that the cars are switched into the various ladder tracks with a locomotive instead of by rolling down a hump. The invention works to provide a device that can be applied to each car and utilize the car brakes to check excessive speed during switching. At the turn of the decade, a conservative estimate would slow that impact damage to both cars and lading is in the hundreds of millions of dollars and could be over $100 a year for each car in service. This vehicle-mounted speed control device mounted on each car could eliminate such expenditures.

SUMMARY

Speed control devices applied to each car can be considered in two categories: (1) Devices which sense the presence of a standing car ahead and begin retarding the car at a distance just sufficient to prevent over-speed impacts, and (2) Devices which merely check the car speed as it enters a classification track and then allow it to move approximately no more than 4 m.p.h. until it couples with another, just as is attempted with present car retarders.

Devices of the first type encounter sensing difficulties with a car on a curve entering a ladder track as the device could detect a car on the next track as well as failing to detect a car ahead but on a curve; whereas the devices of the second type are only triggered into action when a car enters a lading track. The invention contemplates a speed control device mounted on the car such that if the car enters at a speed greater than 4 m.p.h. (miles per hour) the brakes are automatically applied and when the car slows to, say, 3½ m.p.h. the brakes are released. If, for some reason, the car should accelerate and the speed again exceed 4 m.p.h. the brakes are reapplied so that once the car enters the ladder track its speed cannot exceed 4 m.p.h. The device employs electric current generating means and a speed sensing switch means carried by the car and driven by the car wheel. An on-car magnetic switch means is activated by a ground-mounted magnetic means at the entrance of every ladder track, the switch means tripping a relay means and closing the speed control circuit means to operate a solenoid air valve for applying and releasing the car brakes. When the car finally couples to the other car and stops, no more current is supplied by the generator, releasing the relay means and readying the device for the next operation. The invention has for its object to provide for the on-car mounted speed control device that is initially conditioned for operation by off-car trip means whereby the car speed will control the operation of the speed control device until the car stops. The speed control device operates the brake means only upon exceeding a pre-determined speed when current is available as generated by the wheel rim to operate the solenoid valve in accordance with the operation of the speed control switch which introduces the current to the solenoid air valve. This provides for a smooth, accurate and sensitive operation of the speed control device.

These and other objects, advantages and purposes will become apparent from reference to the following description and drawings.

BRIEF DESCRIPTION OF THE DRAWINGS

FIG. 1 is a bottom plan view of the railroad car embodying my invention;

FIG. 2 is a perspective view of a car truck wheel mounting the inventive speed control device, and FIG. 3 is a schematic view of the pneumatic and electrical circuitry incorporating the novel components of the inventive speed control device.

DESCRIPTION OF THE PREFERRED EMBODIMENT

With reference now to the drawings, FIGS. 1–3, there is shown a railroad box car 1, such as shown in my copending patent application, Ser. No. 694,435, filed on Dec. 29, 1967, and entitled, "Vehicle Speed Control Device." The car 1 has an underside 2 carried by trucks 3 having truck structure 4 having side frames 4a and 4b and bolster 4c. The wheels 5 have rim 5a and side peripheral surface 5b and are stopped by brake shoes 6 carried by brake beams 7 operated by braking linkage or rigging 8 operated by brake cylinder 9 supplied with air pressure from reservoir 10 via the conventional AB valve 11 and a reservoir isolating valve 11a. The valve 11a may be operated by the brake release rod 12 for placing the reservoir 10 by way of reservoir isolating valve 11a in communication with the speed control device 13. As seen in FIG. 3, air lines 11b, 11b', 11c, 11c', 11d, 11e, 11f and 11g supply pressurized air between the reservoir 10, the valves 11 and 11a, the cylinder 9 and the speed control valve 27 as more fully disclosed in the copending application above referred to.

As seen in FIGS. 1–2 there is provided an on-vehicle mounted speed control device 13 and a vehicle mounted magnetic switch 14 operated by a magnetic spike 15 mounted in the cross tie 17 between the rails 16.

The magnetic switch 14 is carried by the switch bracket 14a mounted on the underside of the side frame 4b. As seen in FIG. 3, the speed control device 13 includes the wheel driven generator or operator 25, the speed responsive switch 26, the solenoid air valve 27, the relay 28 and attendant pneumatic and electrical structure therefor. The generator and speed responsive switch of the speed control device 13 is carried by the speed control mounting bracket 18 having a base 19 mounted on the end of the side frame 4b. The bracket 18 has a base plate 20 connected with an upright bracket plate 22 by a spring loaded hinge 21 biasing the plate 22 toward the rim surface 5b of the wheel 5 as seen in FIG. 2. A mounting block or base 13a projects outwardly from the upright plate 22 and carries in an upright manner the rim engaging wheel 23 of the speed control device, as well as the generator 25 and the centrifugal switch 26. The friction drive wheel 23 engages the rim 5b to drive through shaft 24 the electric generator 25 and the speed responsive switch or centrifugal switch 26. When electric current supplied by the generator 25 is supplied to the solenoid operated speed control valve 27, air is admitted to the brake cylinder 9 for operation of the vehicle brake shoes to be explained later. The relay arrangement 28 is energized when the magnetic switch 14 is tripped by the magnetic spike 15 to close the circuit.

The starter means or momentary closing means or magnetic switch comprises a housing 14g in which is located magnetically responsive arm and contact 14b which is drawn against lower arm and contact 14c for completing the circuit at the magnetic switch 14. The housing is carried by bracket members 14a and 14d. Electrical leads 14e and 14f are respectively joined with the contacts 14b and 14c and are connected to the electric circuit 29.

The shaft 24 comprises an armature shaft portion 24a and a centrifugal shaft portion 24b for driving the armature 25c and centrifugal switch 26 respectively. The electric generator 25 is composed of a housing 25a carrying a permanent magnet 25b and is provided with the armature 25c which has windings 25d connecting with commutator 25e engaging with brushes 25f and has electrical leads 25g and 25h for connecting with the electrical circuit 29. The electrical generator is conventional and is of the small permanent magnet field type.

The solenoid operated speed control valve 27 comprises a housing or body 27a provided with a bore 27b and has air inlet 27d from isolating valve 11a and an air outlet 27c to brake cylinder 9 and an exhaust line 27e by way of AB valve 11f. A spool 27f rides in the bore 27b and is provided with a grooved or reduced portion 27g. The spool is provided with a solenoid 27h and including the solenoid core 27i and the return spring 27j, the solenoid housing 27k and electrical lines 27n and 27m connecting with the electrical circuit 29.

The electrical relay means 28 comprises a pivotally mounted arm or relay switch 28f adapted for electrical engagement with a relay core 28a provided with a coil 28b and all within an enclosure 28c and having electrical leads 28d and 28e connecting with the electrical circuit 29. The arm 28f pivots about the pivot means 28g and is connected with a spring 28h which keeps the arm 28f away from the core 28a until energized. The arm 28f is provided with electrical conductive or metallic areas 28i and 28j for completing the circuit 29 with metallic area or electrical magnetic responsive area 28k which is drawn to the electrical core 28a when the latter is energized by the closing of the magnetic switch means 14 to complete the electrical circuit with the generator 25. Now when the speed responsive switch means 26 is closed the circuit 29 is complete so that current from the generator 25 is supplied to the solenoid air valve means 27 energizing same to supply air pressure for braking of the car.

The speed responsive switch means 26 is similar in arrangement and in function to the centrifugal means or governor means of my above mentioned copending applications. Ser. No. 694,435 and Ser No. 694,705. The switch means comprises a centrifugal switch housing 26a provided with speed responsive governor weights 26b thrown outwardly by rotation of the centrifugal switch shaft portion 24b, the weights 26b being supported by the governor weight support structure 26c such that the weights engage the contact means 26d to engage the contact points 26e for completing the circuit 29d at the centrifugal switch means 26 in order to energize the solenoid valve 27.

The circuit 29 comprises circuit line portions 29a, 29b, 29c, 29d, 29e, 29f, 29g and 29h for interconnecting the electrical components 25, 26 and 27 in a series connection with one another, as shown in FIG. 3 due to energizing of the relay means 28 by the magnetic switch 14 such that if switch 14 is tripped by magnet 15, the relay means or starter 28 goes in the closed circuit position and the solenoid 27 in the circuit will be energized if the centrifugal switch means 26 is in the closed circuit position. In the closed circuit position of arm 28f (solid line position of FIG. 3) the relay coil 28a is in parallel connection with the switch 26 so if the switch 26 opens the relay coil 28f can still remain energized by the generator 25. The switch 15 and the relay means 28 including switch arm 28f act as a starter means that is started or actuated by the magnetic spike or tripping means 15.

The speed control device 13 is put into operation only when the car 1 enters the ladder track and passes over the magnetized spike 15 which is located at the entrance of every ladder track. The generator 25 and the speed responsive switch 26 mounted on the spring loaded bracket on the truck side frame are driven by teh outside edge of the wheel rim when the car is moving and an electrical current is generated by the generator 25. As the car passes over the magnetic spike 15 it closes the magnetic switch 14 and completes the circuit 29 between the generator 25 and the relay 28 and the relay 28 is energized. The energized relay 28 raises its arm 28f to make available supply of current to one side of the solenoid valve 27, the generator 25, and the speed responsive switch 26. After the car magnetic switch 14 passes the magnetic spike 15, the switch 14 opens but the relay or holding means 28 remains energized by generator 25 which operates so long as the car is rolling. If the car is rolling at a speed in excess of 4 m.p.h., as predetermined by the governor of the speed responsive switch 26, the speed responsive switch contacts close to complete the circuit between the generator 25 and the solenoid operated air supply valve or speed control valve 27 which then is opened to supply air pressure from valve 11a previously opened by brake release rod 12 to the car brake cylinder 9 for applying the car brakes 6 to slow the car down. When the speed of the car falls below approximately 4 m.p.h. the speed responsive switch 26 again opens to de-energize the solenoid valve 27 where upon the brakes 6 are removed (the condition shown in FIG. 3). This operation of applying or releasing the brakes to maintain the vehicle at approximately 4 m.p.h. continues until the car impact couples with a standing car on the ladder track whereupon the moving car comes to rest and the generator 25 ceases generating current whereupon relay 28 opens and will remain open until at another time the car rolls over a magnet spike in a ladder track. The car brakes can not be applied in a train of cars during main lines service, as the brake release rod of each car is reset to close the isolating valve 11a to the pressurized air reservoir 11. A distinct advantage of this speed control device is that the generator 25 is producing current below 4 m.p.h. so that when the speed of 4 m.p.h. is attained and the speed responsive switch 26 closes the circuit to the solenoid air valve 27 full current is immediately supplied to the solenoid air valve 27 for fast closing of the valve 27. If increasing current were gradually supplied to gradually move the valve 27 to the air supply position where no speed responsive switch 26 was used, the valve 27 could have a greater tendency to become stuck in attempting to operate, thwarting proper functioning of the speed control device.

The foregoing description and drawings are given merely to explain and illustrate the invention, and the invention is not to be limited thereto, since those skilled in the art who have the disclosure before them will be able to make modifications and variations therein without departing from the scope of the invention.

What is claimed is:

1. A speed control device for a vehicle comprising:
   an electric circuit,
   an electric generator in said circuit and for mounting on the car and operatively connectible with the vehicle wheel and drivable thereby,
   a speed responsive switch in said circuit and operatively connectable with said wheel and drivable thereby to complete the electric circuit to the generator in going from an open position to a closed position when the vehicle exceeds a predetermined speed,
   an off-vehicle triggered switch element in said circuit having opened and closed circuit positions and mountable on said vehicle and connecting with the generator,
   a holding relay in said circuit being in series connection with said switch element and said generator, said switch element being in the closed position and said holding relay being in the closed position and said holding relay being energized and placed in parallel connection with said speed responsive switch, said holding relay being mountable on said car,
   a solenoid actuated air valve for supplying and terminating the supply of air pressure to the vehicle brakes being in said circuit and having a series connection with said speed responsive switch and with said generator when said holding relay is energized, said solenoid valve being mountable on said car, and
   said speed responsive switch in going from the open to the closed position upon the vehicle exceeding a predetermined speed causing the solenoid valve to be placed in a closed circuit series connection with the generator when the holding means is energized whereby the solenoid valve is moved for supplying air pressure to brake the vehicle, whereupon when the vehicle speed falls below the predetermined speed the speed responsive switch opens the circuit and the solenoid valve closes off the air supply to the vehicle brakes.

2. The invention according to claim 1, and
   said switch element being momentarily closed by an off-vehicle triggering means as the element passes by.

3. The invention according to claim 2, and
   said switch element comprising a magnetic sensitive element,
   and triggering means comprising magnetizing element mountable in the path of the vehicle, magnetizing the magnetic switch elements to the closed circuit position momentarily if the vehicle passes by the magnetic sensitive element to operate the relay to close the holding circuit between the generator and the relay whereby when the speed responsive switch moves to the closed circuit position said solenoid valve is energized to supply air pressure to the vehicle brakes for reducing the vehicle speed below the predetermined speed whereupon the speed responsive switch moves to the open circuit position and deenergizes the solenoid valve to release the vehicle brakes.

4. A speed control device for braking a railroad vehicle comprising:
   an electric circuit,
   electric power means in said circuit for mounting on the vehicle,
   a vehicle driven speed responsive means in said circuit to complete the electric circuit when the vehicle exceeds a predetermined speed,
   off-vehicle triggered momentary circuit closing means in said circuit having opened and closed circuit positions and mountable on said vehicle,
   holding means in said circuit being in series connection with said electric power means whereby when said circuit closing means is in the closed position, said holding means is energized, said holding means when energized being in parallel connection with said speed responsive means,
   an electrically energized air valve for supplying and interrupting the supply of air pressure for braking the vehicle having an operative connection with the holding means and having a series connection with said speed responsive means and with said electric power means when said holding means is energized, and
   said speed responsive means upon the vehicle exceeding a predetermined speed causing the valve to be placed in a closed circuit series connection with the electric power means whereby the valve is moved for supplying air pressure to brake the vehicle, whereupon when vehicle speed falls below the predetermined speed the speed responsive means opens the circuit to the solenoid valve and the valve closes off the air pressure to brake the vehicle.

5. A speed control for application of fluid pressure to the brakes of a vehicle comprising:
   a vehicle mounted electrical power means,
   speed responsive electrical switch means being connected with the power means and having a valve operating position upon reaching a predetermined vehicle speed,
   vehicle starter means being momentarily tripped by movement of the vehicle by an associated ground mounted tripping means to a closed circuit position and being connected with power means and placing the power means in series with the speed responsive switch means and the speed responsive switch means in parallel with vehicle starter means, and
   an electrically energized valve for supplying pressure for the vehicle brakes being connected with said power means and said switch means and being energized by said speed responsive switch means reaching the predetermined speed and completing the circuit between the power means and the valve and whereby below the predetermined speed the valve is deenergized for terminating braking of the vehicle, said power means supplying current to the vehicle starter means in the closed circuit position of the vehicle starter means at a vehicle speed below the predetermined vehicle speed when the speed responsive switch means is in an open circuit position.

6. The invention according to claim 5, and
said vehicle starter means comprising a momentary switch actuated by the associated ground mounted tripping means and including a relay means and an arm switch energized thereby to close the circuit between the power means and the valve when said momentary switch is tripped, said relay means forming a holding circuit with said power means which holds the relay means in the energized condition.

7. The invention according to claim 5, and
said starter means including an off-vehicle starter tripped by an off-vehicle tripping means as the vehicle passes thereover.

8. The invention according to claim 5, and
said starter means including a starter switch means for connecting said power means with the valve for opening same to cause braking of the vehicle.

9. The invention according to claim 8, and
said starter switch means including a momentary switch which operates to open the valve to the vehicle brake means only when the switch is tripped as the vehicle passes over ground mounted switch tripping means.

10. The invention according to claim 8, and
said starter switch means including a ground actuated momentary switch which is closed only during the time the vehicle passes over a ground mounted switch tripper and holding relay means energized by closing of said momentary switch for the power means to open said valve.

11. The invention according to claim 5, and
said power means including an electric generator driven by movement of the vehicle to energize and move the valve for braking the vehicle.

12. The invention according to claim 5, said power means including a generator and
said valve having a solenoid energized by said generator.

13. The invention according to claim 5, and a ground mounted tripping means for actuating said starter means.

14. The invention according to claim 10, and
an on-vehicle road tripping means for actuating said momentary switch.

15. The invention according to claim 14, and
said momentary switch being magnetically sensitive and said tripping means being a magnetic element.

16. In a vehicle having a fluid brake system for supplying fluid under pressure to the vehicle brake cylinder from a reservoir,
a speed control device for controlling the speed of a vehicle, comprising:
a generator and a speed responsive means driven by vehicle movement,
switch and relay means tripped from open to closed positions by an off-vehicle tripping means,
said switch and relay means connecting with said generator and energized by the generator to remain in a closed position,
said speed responsive means having a switch movable to either of two positions in accordance with vehicle speed,
fluid supply means for supplying fluid under pressure to brake the vehicle speed and being operatively connected with said generator and said switch and relay means by said speed responsive means in one position of said selector means for braking vehicle speed when a predetermined vehicle speed is attained,
the speed responsive means in moving to the second position below the predetermined speed deactivating said fluid supply means.

17. The invention according to claim 16, and
reservoir isolating valve means interposed between the reservoir and the speed control device,
said reservoir valve having a reservoir isolating position in service and having an air supply position to the fluid supply means for speed control operation.

18. A speed control device for the brakes of a vehicle comprising:
electrical power means and vehicle speed responsive means connected therewith,
an off-vehicle tripped and on-vehicle mounted starter switch means having an operative vehicle tripped position and connecting with the power means,
a relay means being operatively connected with said starter switch means and with said power means and being energized when said starter switch means has been tripped,
a supply valve for supplying brake pressure to the vehicle brakes when the speed responsive means reaches a predetermined speed, said valve being connected with said relay means when energized and being connected with said speed responsive means when the predetermined speed is reached, said relay means remaining energized when said speed responsive means is disconnected from the valve when below the predetermined speed.

19. The invention according to claim 18, and
off-vehicle tripping means cooperative with the starter switch means for momentarily tripping the latter upon the presence of the vehicle at the proximity of the off-vehicle tripping means.

20. The invention according to claim 18, and
means for releasing the speed control device for trainline operation of the vehicle.

21. The invention according to claim 18, and
said power means comprising a generator for supplying a source of current to the supply valve for operation thereof.

22. The invention according to claim 21, and
said supply valve being electrically operated,
said vehicle speed responsive means comprising a speed responsive switch having an operating position for supplying current to the valve as delivered by the generator.

23. The invention according to claim 21, and
said relay means including a relay coil and a relay switch energizable by the coil to move the relay switch into a series connection with the power means.

24. The invention according to claim 22, and
said speed responsive switch including a centrifugal switch completing energization of the valve upon attainment of a predetermined vehicle speed.

25. The invention according to claim 18, and
said starter switch means including a magnetically responsive switch and said relay means including an energizing relay coil means energized to close the starter switch means in a holding circuit with the power means upon closing of said magnet switch by an off-vehicle magnet tripper, said energized relay coil means being in parallel connection with the speed responsive means.

26. The invention according to claim 18, and
trip means for momentarily tripping said starter switch means being located in the path of the vehicle and being tripped by movement of the vehicle thereby.

27. The invention according to claim 18, and means for isolating the speed responsive device from operation during the trainline use with other vehicles.

28. The invention according to claim 18, and
off-vehicle tripping means of the nonobject-sensing type being ground-mounted and operated by the propinquity of the vehicle which carries the device irrespective of any distance between the moving and nonmoving car and being engageable with the starter switch means to move it to the tripped position.

29. The invention according to claim 18, and
off-vehicle tripping means fixed in movement with respect to the ground and located in the path of the vehicle to be tripped by movement of the vehicle thereby cooperative with said primary starter switch for placing said holding starter switch in a holding circuit situation.

30. The invention according to claim 29, and
said off-vehicle tripping device being momentarily closing said primary starter.

31. The invention according to claim 30, and
said energized relay means being in parallel connection with the speed responsive means.

32. The invention according to claim 31, and
means rendering the speed control means inactive during the trainline operations.

33. An electrically operating speed control device for a railroad vehicle to control the wheel speed thereof comprising:
a wheel driven speed responsive means responsive to the speed of the vehicle to effectuate the braking of the vehicle's speed should the vehicle exceed a predetermined speed,
speed control means operatively connected with the governor means and operated thereby above the predetermined speed to brake the speed of the vehicle,
starter means operatively connected with said speed control means and effective to operate as speeds below and above the predetermined speed,
holding means operatively connected with the speed control means for holding the speed control means in operative connection with the governor means in a speed range which is between a minimum vehicle speed below the said predetermined speed and a vehicle speed which is above the said predetermined speed,
said starter means operatively being connected with the holding means and operative thereupon for operation of the holding means at speeds above said minimum speed,
ground mounted tripping means momentarily engaging the starter means as the vehicle passes for operating the holding means at speeds in excess of said minimum vehicle speed, and
vehicle wheel speed controlled generator means operatively associated with the holding means and operative below the predetermined speed to terminate operation of the holding means at said minimum speed whereby the holding means is inoperative again until the starter means is tripped by the off vehicle tripping means when the vehicle is moving above said minimum vehicle speed.

References Cited

UNITED STATES PATENTS

| | | | |
|---|---|---|---|
| 941,541 | 11/1909 | Simmen | 246—182 X |
| 1,183,677 | 5/1916 | Sanborn et al. | 246—182 |
| 3,370,166 | 2/1968 | DaRold et al. | 246—182 |
| 3,385,964 | 5/1968 | Clejan et al. | 246—182 |

ARTHUR L. LA POINT, Primary Examiner

G. H. LIBMAN, Assistant Examiner

U.S. Cl. X.R.

303—21